United States Patent
Qian et al.

(10) Patent No.: US 10,789,425 B2
(45) Date of Patent: Sep. 29, 2020

(54) GENERATING A RESPONSE TO A NATURAL LANGUAGE COMMAND BASED ON A CONCATENATED GRAPH

(71) Applicant: LENOVO (Singapore) PTE. LTD., New Tech Park (SG)

(72) Inventors: Ming Qian, Cary, NC (US); Jatinder Kumar, Cary, NC (US); John Weldon Nicholson, Cary, NC (US); David Alexander Schwarz, Morrisville, NC (US); Song Wang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 10 days.

(21) Appl. No.: 15/614,348

(22) Filed: Jun. 5, 2017

(65) Prior Publication Data
US 2018/0349353 A1    Dec. 6, 2018

(51) Int. Cl.
| | |
|---|---|
| G06F 40/216 | (2020.01) |
| G06F 40/268 | (2020.01) |
| G06F 40/284 | (2020.01) |
| G06T 11/20 | (2006.01) |
| G06T 11/60 | (2006.01) |

(52) U.S. Cl.
CPC .......... G06F 40/216 (2020.01); G06F 40/268 (2020.01); G06F 40/284 (2020.01); G06T 11/206 (2013.01); G06T 11/60 (2013.01)

(58) Field of Classification Search
CPC .......................... G06F 17/30554; G10L 15/183
See application file for complete search history.

(56) References Cited

U.S. PATENT DOCUMENTS

| | | | | |
|---|---|---|---|---|
| 6,516,308 B1* | 2/2003 | Cohen | ................ | G06F 16/9574 |
| | | | | 706/12 |
| 7,512,612 B1* | 3/2009 | Akella | ............. | G06F 17/30958 |
| 9,406,020 B2* | 8/2016 | Arroyo | .................... | G06N 5/02 |
| 9,460,075 B2* | 10/2016 | Mungi | ................. | G06F 17/271 |
| 9,703,845 B2* | 7/2017 | Iesiev | ................. | H04L 63/1408 |
| 10,311,050 B2* | 6/2019 | Beller | ................ | G06F 16/9024 |
| 2006/0053151 A1* | 3/2006 | Gardner | ............... | G06F 17/279 |

(Continued)

FOREIGN PATENT DOCUMENTS

WO    WO-2014127500 A1 *    8/2014    ....... G06F 17/30684

OTHER PUBLICATIONS

Conneau, Alexis, et al. "Supervised learning of universal sentence representations from natural language inference data." arXiv preprint arXiv:1705.02364 (2017). Submitted on May 5, 2017. Retrieved on May 18, 2020 from <https://arxiv.org/abs/1705.02364> (Year: 2017).*

*Primary Examiner* — Daniel C Washburn
*Assistant Examiner* — Oluwadamilola M Ogunbiyi
(74) *Attorney, Agent, or Firm* — Kunzler Bean & Adamson

(57) ABSTRACT

For generating a response to a natural language command based on a concatenated graph, a processor identifies one or more relevant data sets in response to a natural language command received from an input device. Each relevant data set includes one of a subject of the natural language command and a subject of another relevant data set. The processor further generates a graph for each of the one or more relevant data sets and concatenates the graphs into a concatenated graph. In addition, the processor generates a response to the natural language command based on the concatenated graph.

9 Claims, 16 Drawing Sheets

(56) References Cited

U.S. PATENT DOCUMENTS

| | | | |
|---|---|---|---|
| 2006/0277165 A1* | 12/2006 | Yoshimura | G06F 17/30654 |
| 2008/0104071 A1* | 5/2008 | Pragada | G06F 17/3043 |
| 2008/0235199 A1* | 9/2008 | Li | G06F 16/243 |
| 2012/0158633 A1* | 6/2012 | Eder | G06N 5/022 706/46 |
| 2012/0254143 A1* | 10/2012 | Varma | G06F 17/2785 707/706 |
| 2013/0218887 A1* | 8/2013 | Yildiz | G06F 3/00 707/736 |
| 2013/0262361 A1* | 10/2013 | Arroyo | G06N 5/02 706/46 |
| 2013/0282710 A1* | 10/2013 | Raghavan | G06F 17/30554 707/728 |
| 2014/0025706 A1* | 1/2014 | Barve | G06F 17/21 707/771 |
| 2014/0280044 A1* | 9/2014 | Huynh | G06F 17/30477 707/722 |
| 2014/0280307 A1* | 9/2014 | Gupta | G06F 16/3331 707/769 |
| 2014/0282219 A1* | 9/2014 | Haddock | G06F 16/36 715/781 |
| 2015/0100568 A1* | 4/2015 | Golden | G06N 5/02 707/722 |
| 2015/0149464 A1* | 5/2015 | Delpic | G06F 16/64 707/737 |
| 2017/0199882 A1* | 7/2017 | Byron | G06N 20/00 |
| 2018/0082183 A1* | 3/2018 | Hertz | G06Q 10/10 |
| 2018/0150753 A1* | 5/2018 | Farrell | G06N 5/022 |

\* cited by examiner

110

110

GENERATING A RESPONSE TO A NATURAL LANGUAGE COMMAND BASED ON A CONCATENATED GRAPH

FIELD

The subject matter disclosed herein relates to generating a response and more particularly relates to generating response to a natural language command based on a concatenated graph.

BACKGROUND

Description of the Related Art

An input device may receive a natural language command.

BRIEF SUMMARY

An apparatus for generating a response to a natural language command based on a concatenated graph is disclosed. The apparatus includes an input device, a processor, and a memory that stores code executable by the processor. The processor identifies one or more relevant data sets in response to a natural language command received from the input device. Each relevant data set includes one of a subject of the natural language command and a subject of another relevant data set. The processor further generates a graph for each of the one or more relevant data sets and concatenates the graphs into a concatenated graph. In addition, the processor generates a response to the natural language command based on the concatenated graph. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
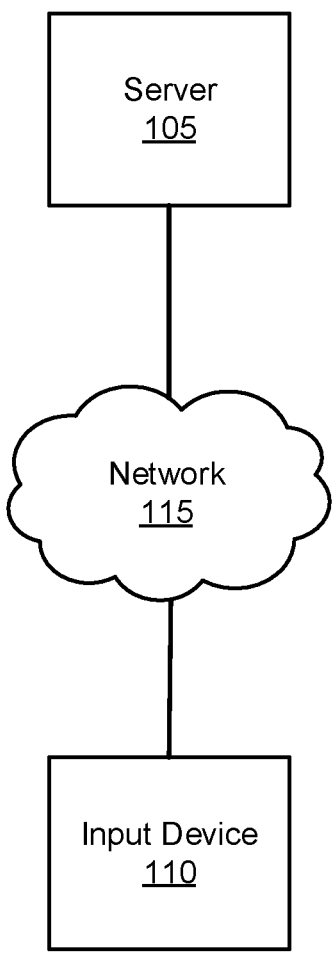
FIG. 1A is a schematic block diagram illustrating one embodiment of a response system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a response system 100. The system 100 may generate a response to a natural language command using graphs. Each graph may comprise one or more subjects and one or more relationships between the subjects. In addition, the graphs may be organized for multidimensional analysis and display as will be described hereafter. In the depicted embodiment, the response system 100 includes a server 105, an input device 110, and a network 115.

The network 115 may be the Internet, a wide-area network, a local area network, a mobile telephone network, a Wi-Fi network, or combinations thereof. The input device 110 may receive a natural language command. The input device 110 may communicate with the server 105 through the network 115.

It is often difficult to interpret and generate a response to natural language commands as so much information may be relevant. The embodiments described herein identify one or more relevant data sets based on a natural language command and generate a graph for each of the relevant data sets. The embodiments further concatenate the graphs into a concatenated graph and generate a response to the natural language command based on the concatenated graph as will be described hereafter. The concatenated graph allows for the efficient generation of a response to the natural language command.

Figure 1B:
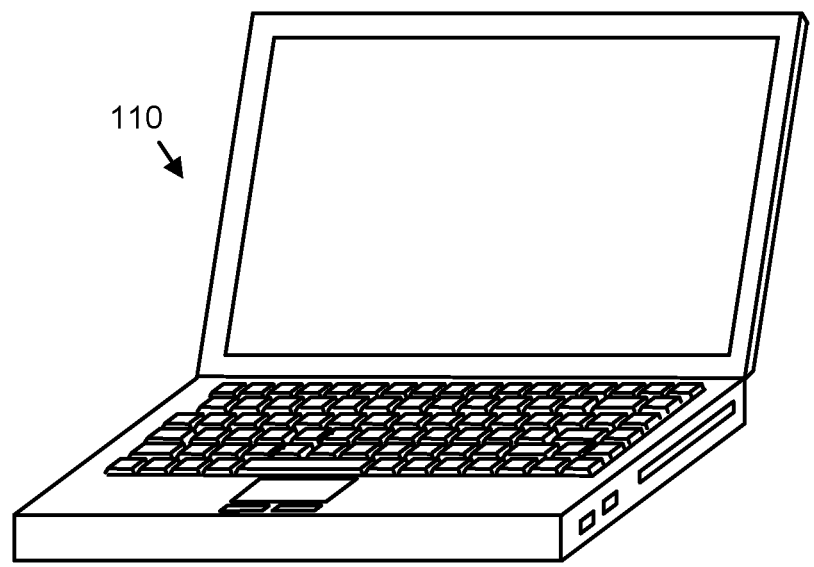
FIG. 1B is a perspective drawing illustrating one embodiment of an input device.

FIG. 1B is a perspective drawing illustrating one embodiment of an input device 110. In the depicted embodiment, the input device 110 is a laptop computer. A natural language command may be entered through the keyboard and/or a microphone. In addition, the laptop computer may display one or more graphs, as well as a response.

Figure 1C:
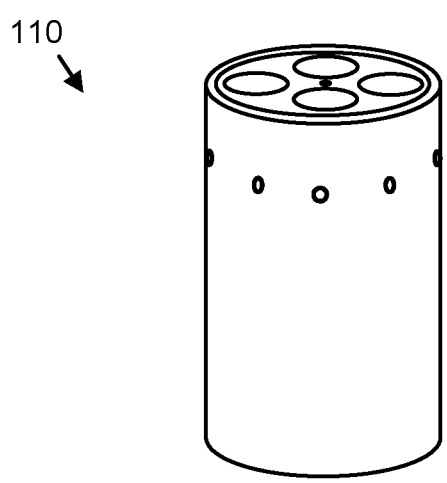
FIG. 1C is a perspective drawing illustrating one embodiment of an input device.

FIG. 1C is a perspective drawing illustrating one embodiment of an input device 110. In the depicted embodiment, the input device 110 is a virtual assistant. The natural language command may be entered through microphone. Speakers may communicate a response.

Figure 1D:
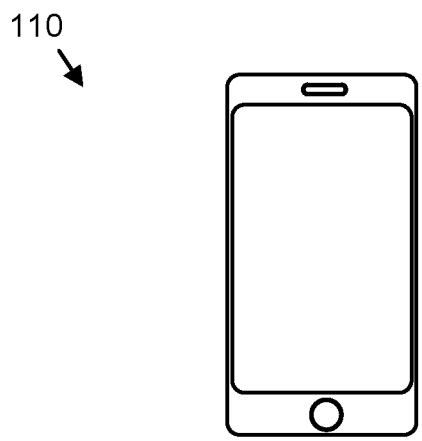
FIG. 1D is a front view drawing illustrating one embodiment of an input device.

FIG. 1D is a front view drawing illustrating one embodiment of an input device 110. In the depicted embodiment, the input device 110 is a mobile telephone. The natural language command may be entered through a touchscreen and/or a microphone. In addition, the mobile telephone may display one or more graphs and the response. A speaker may also communicate the response.

Figure 1E:
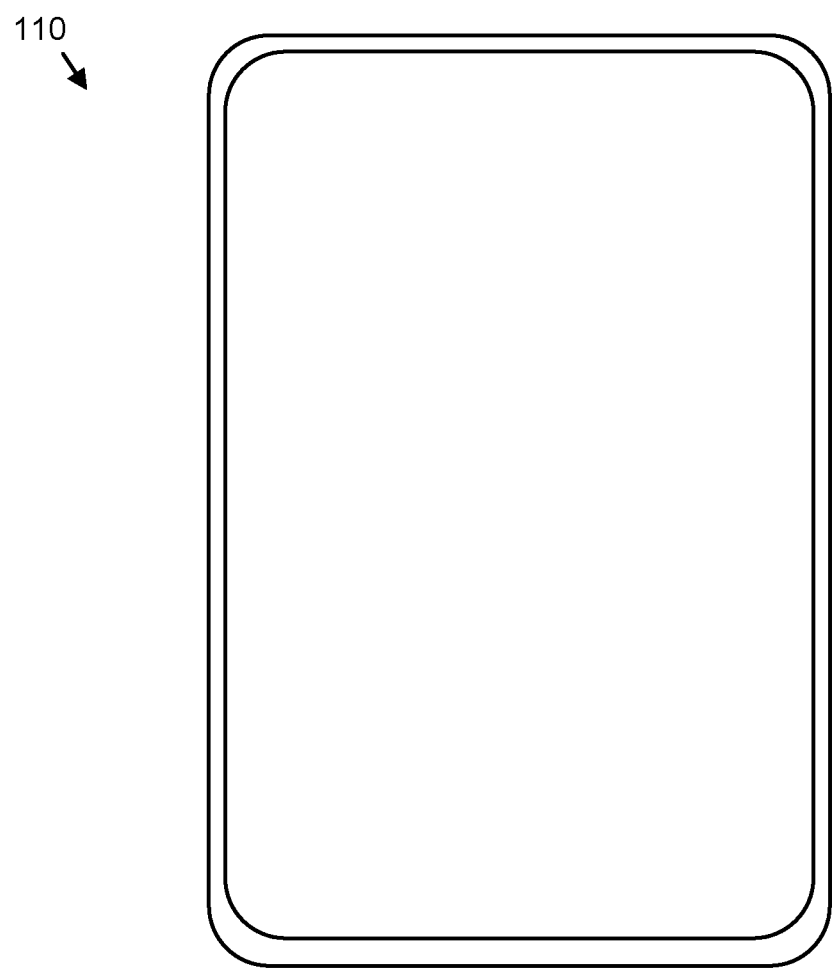
FIG. 1E is a front view drawing illustrating one embodiment of an input device.

FIG. 1E is a front view drawing illustrating one embodiment of an input device 110. In the depicted embodiment, the input device 110 is a tablet computer. The natural language command may be entered through a touchscreen and/or a microphone. In addition, the tablet computer may display one or more graphs and the response. A speaker may also communicate the response.

Figure 2A:
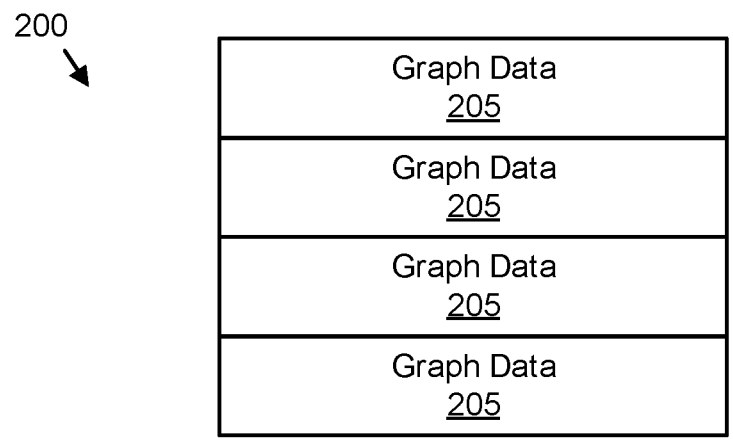
FIG. 2A is a schematic block diagram illustrating one embodiment of a graph database.

FIG. 2A is a schematic block diagram illustrating one embodiment of a graph database 200. The graph database 200 maybe organized as a data structure in a memory. The graph database 200 may reside on the input device 110, the server 105, or combinations thereof. The graph database 200 may store graph data 205 for a plurality of graphs.

Figure 2B:
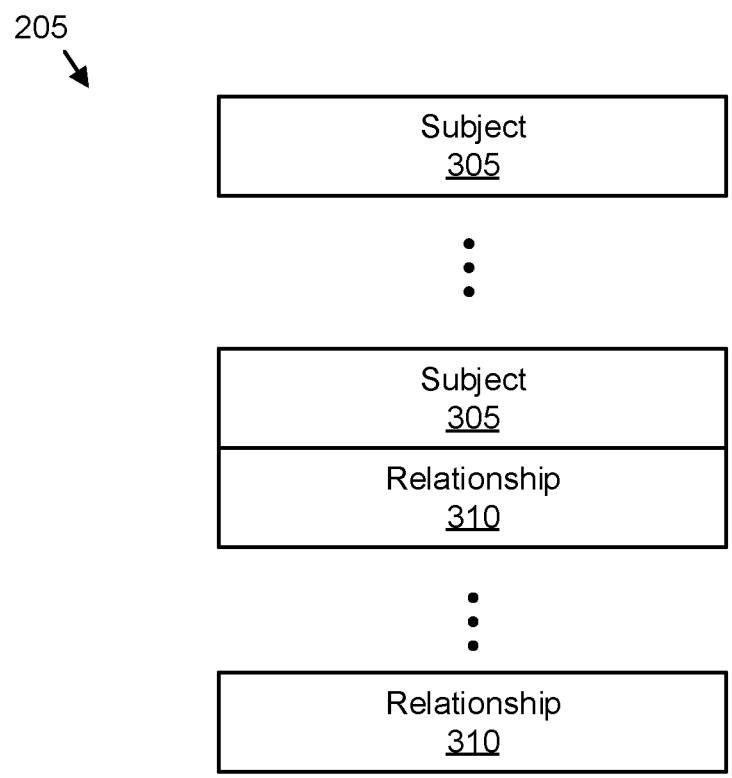
FIG. 2B is a schematic block diagram illustrating one embodiment of graph data.

FIG. 2B is a schematic block diagram illustrating one embodiment of the graph data 205. In the depicted embodiment, the graph data 205 includes a plurality of subjects 305 and a plurality of relationships 310. Each relationship 310 may relate two or more subjects 305.

Figure 2C:
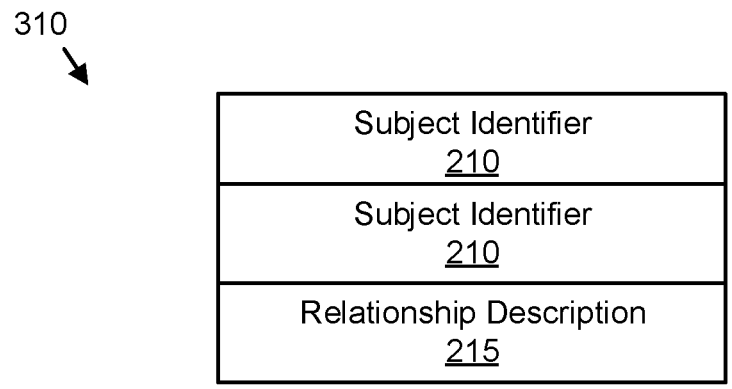
FIG. 2C is a schematic block diagram illustrating one embodiment of a relationship.

FIG. 2C is a schematic block diagram illustrating one embodiment of the relationship 310. In the depicted embodiment, the relationship 310 includes at least two subject identifiers 210. Each subject identifiers 210 may index a subject 305. The relationship 310 further includes a relationship description 215. The relationship description 215 may describe the relationship between the subjects 305 indexed by the subject identifiers 210.

Figure 2D:
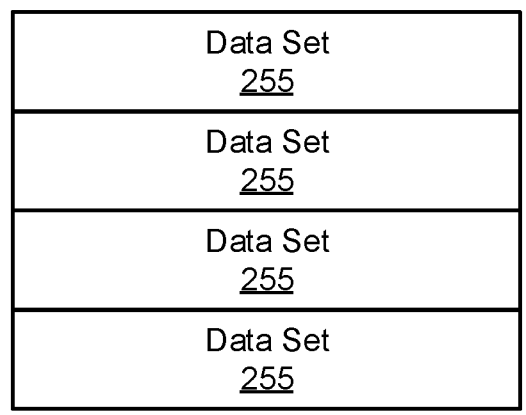
FIG. 2D is a schematic block diagram illustrating one embodiment of data sets.

FIG. 2D is a schematic block diagram illustrating one embodiment of data sets 255. The data sets 255 may be organized as data structures in a memory. The data sets 255 may reside on the input device 110, the server 105, or combinations thereof. Each data set 255 may include one or more of a document, a message, a search result, a webpage, and the like. In one embodiment, a data set 255 may be retrieved in response to a query based on a subject 305 of the natural language command.

Figure 2E:
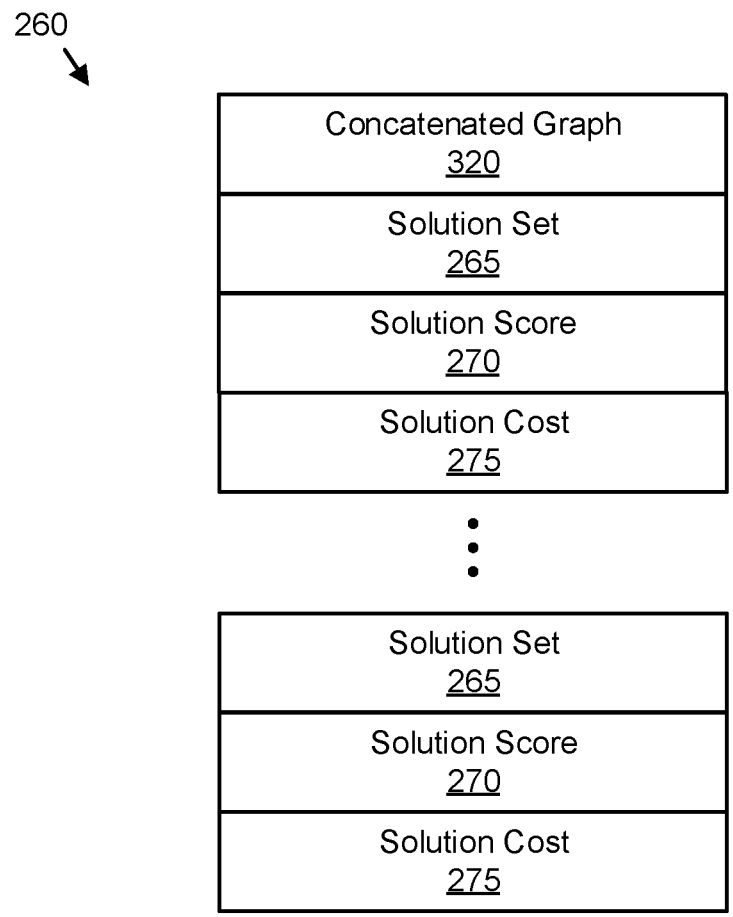
FIG. 2E is a schematic block diagram illustrating one embodiment of solution data.

FIG. 2E is a schematic block diagram illustrating one embodiment of solution data 260. The solution data 260 may be organized as data structures in a memory. The solution data 260 may reside on the input device 110, the server 105, or combinations thereof. In the depicted embodiment, the solution data 260 includes a concatenated graph 320 and one or more solution sets 265. The solution sets 265 may be generated from the concatenated graph 320. In addition, a solution score 270 and a solution cost 275 may be associated with each solution set 265.

Figure 2F:
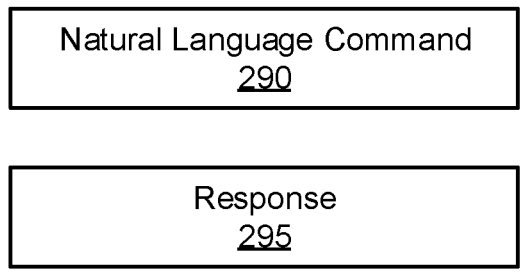
FIG. 2F is a schematic block diagram illustrating one embodiment of a communications.

FIG. 2F is a schematic block diagram illustrating one embodiment of communications including a natural language command 290 and a response 295. The natural language command 290 may be received by the input device 110. The natural language command 290 may be a spoken, audible command. The response 295 may be a spoken response and/or a text response. In addition, the response 295 may include hyperlinks, video, images, and the like. The response 295 may also include taking an action such as scheduling a meeting, sending a message, making a reservation, or the like.

Figure 3A:
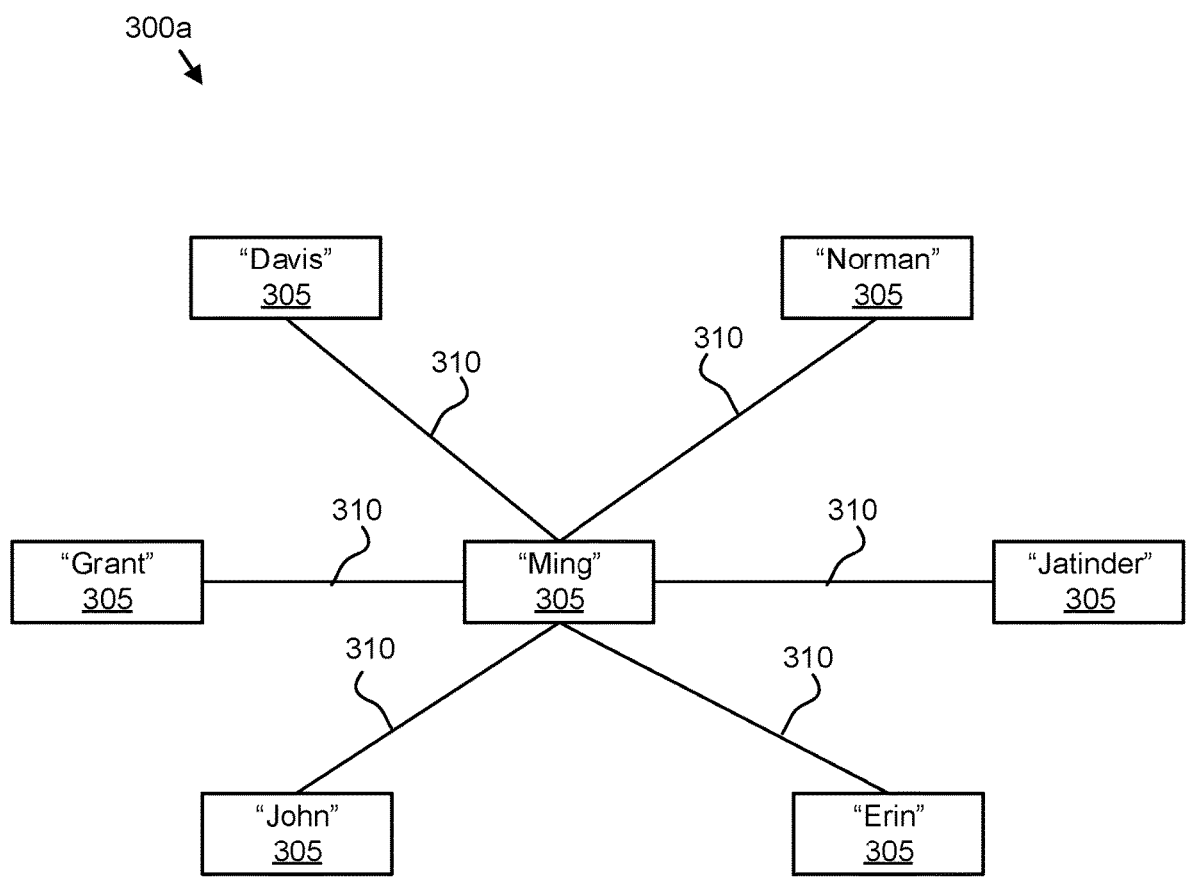
FIG. 3A is a schematic block diagram illustrating one embodiment of a graph.

FIG. 3A is a schematic block diagram illustrating one embodiment of a graph 300. In the depicted embodiment, a first graph 300a is shown. The first graph 300a is shown with the plurality of exemplary subjects 305. Each subject 305 is associated with one or more other subjects 305 by relationships 310. The first graph 300a shows relationships 310 between subjects 305. In addition, graphs 300 may show relationships 310 between activities, interests, schedules, and the like.

In one embodiment, each graph 300 is generated by parsing a data set 255 and identifying one or more subjects 305 and the relationships 310 between the subjects 305. The subjects 305 may be identified as proper nouns, nouns, pronouns, and/or gerunds. The relationships 310 may be inferred between the subjects 305.

In one embodiment, a user may input one or more of the subjects 305 and relationships 310 of the graph 300 directly into the input device 110 using a graphical interface.

Figure 3B:
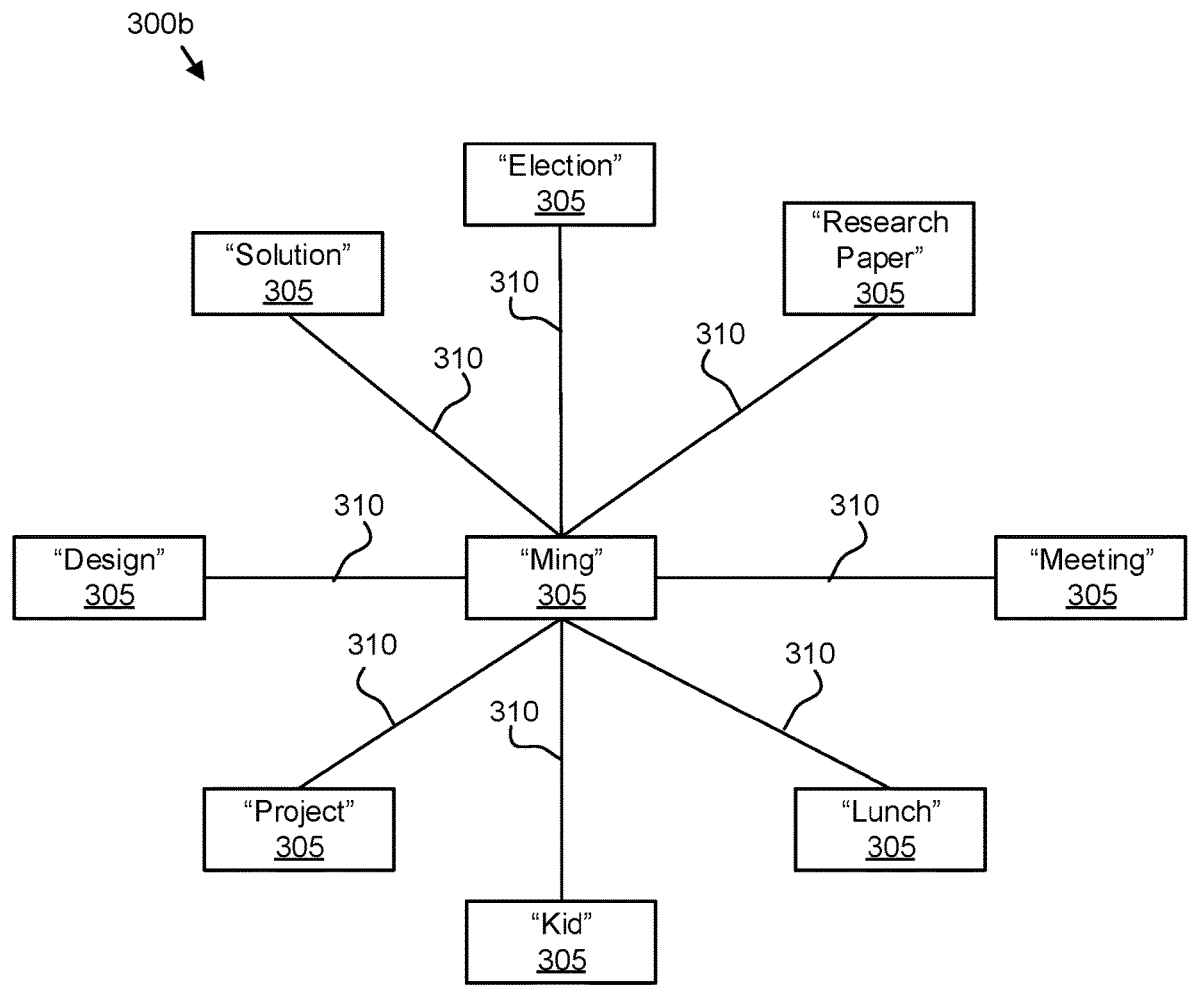
FIG. 3B is a schematic block diagram illustrating one alternate embodiment of a graph.

FIG. 3B is a schematic block diagram illustrating one alternate embodiment of a graph 300. In the depicted embodiment, a second graph 300b is shown. The subjects 305 and relationships 310 that the second graph 300b may be parsed from a data set 255 and/or input by a user.

Figure 3C:
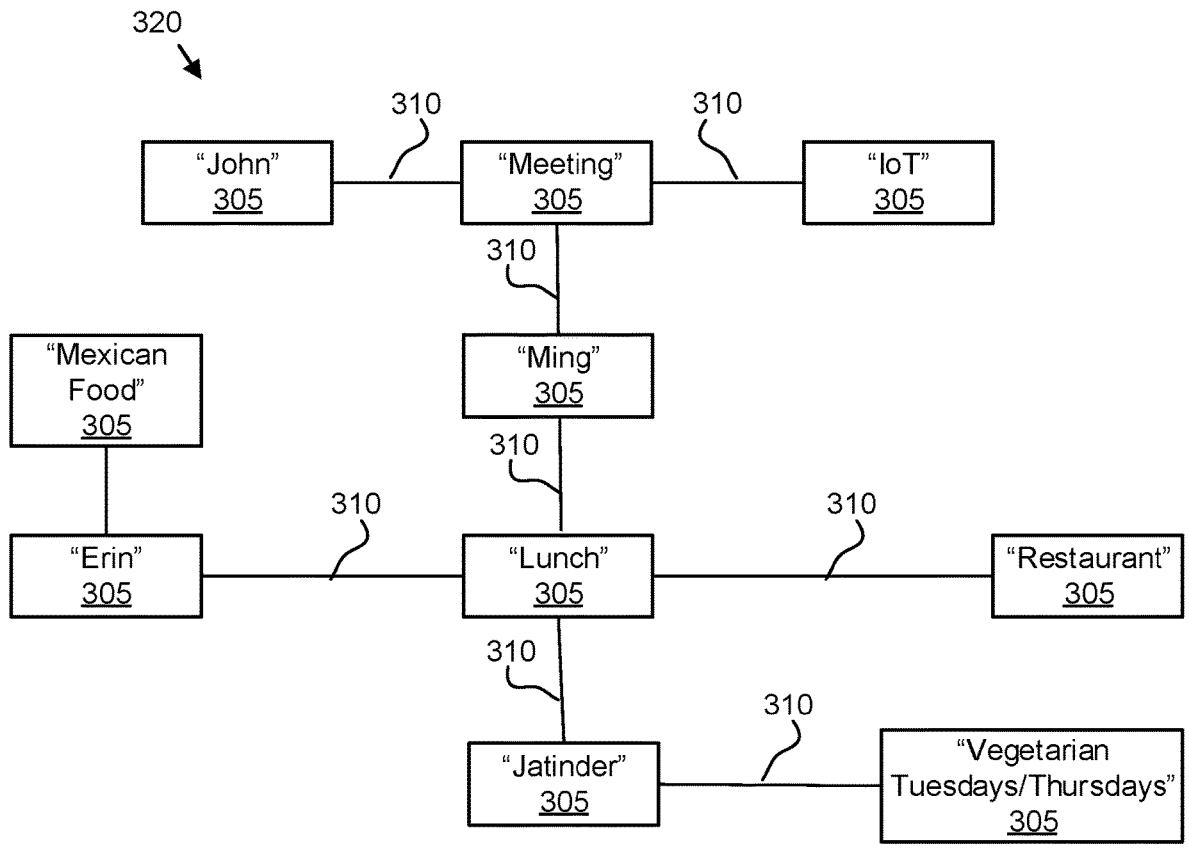
FIG. 3C is a schematic block diagram illustrating one embodiment of a concatenated graph.

FIG. 3C is a schematic block diagram illustrating one embodiment of a concatenated graph 320. Concatenated graph 320 may be generated from two or more graphs 300. In one embodiment, subjects 305 that are common to the two or more graphs 300 are merged as will be described hereafter. In addition, irrelevant subjects 305 may be pruned from the concatenated graph 320.

Figure 4A:
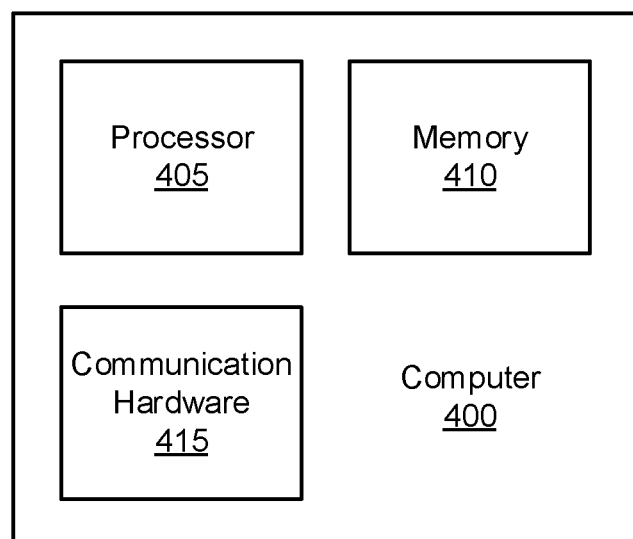
FIG. 4A is a schematic block diagram illustrating one embodiment of a computer.

FIG. 4A is a schematic block diagram illustrating one embodiment of a computer 400. The computer 400 may be embodied in the input device 110, the server 105, or combinations thereof. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices such as the network 115.

Figure 4B:
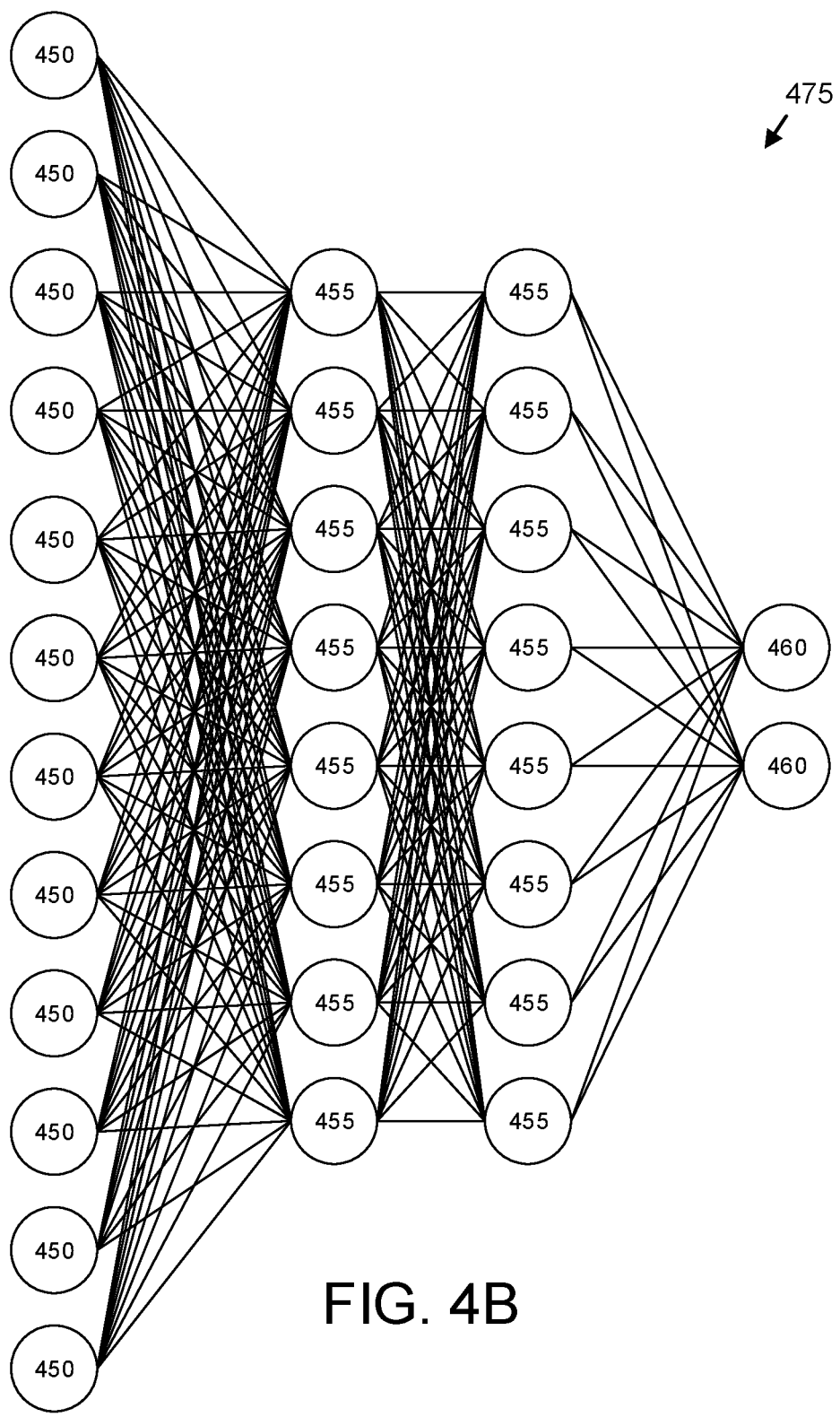
FIG. 4B is a schematic diagram illustrating one embodiment of a neural network.

FIG. 4B is a schematic block diagram illustrating one embodiment of a neural network 475. In the depicted embodiment, the neural network 475 includes input neurons 450, hidden neurons 455, and output neurons 460. The neural network 475 maybe organized as a convolutional neural network, a recurrent neural network, and the like.

The neural network 475 may be trained with training data. The training data may include a data set 255. In addition, the training data may include a graph 300 and/or a concatenated graph 320 embodied in graph data 205. The neural network 475 may be trained using one or more learning functions while applying the training data to the input neurons 450 and known result values for the output neurons 460. Subsequently, the neural network 475 may receive actual data at the input neurons 450 and make predictions at the output neurons 460 based on the actual data. The actual data may include a data set 255, a graph 300, a concatenated graph 320, and graph data 205. The predictions may include a graph 300, a concatenated graph 320, a solution set 265, a solution score 270, and a solution cost 275.

Figure 5A:
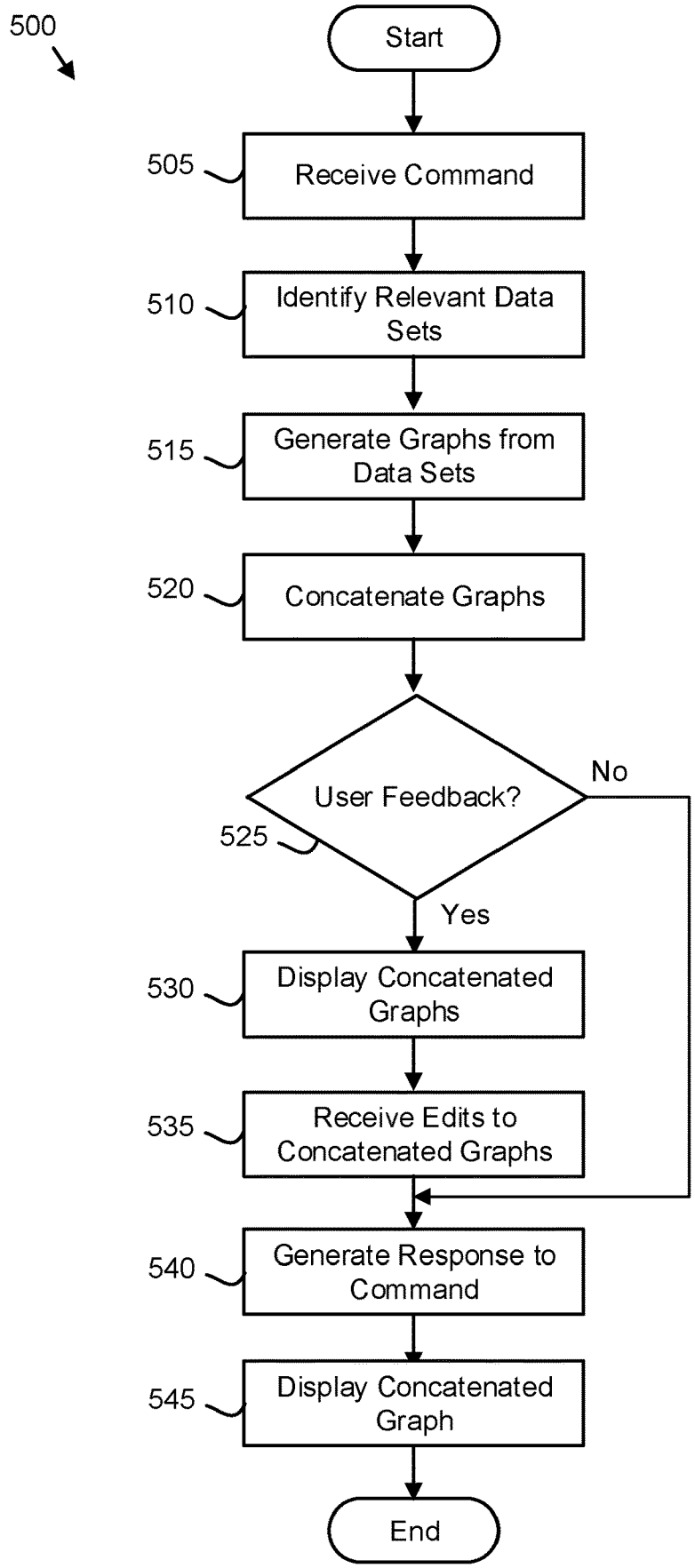
FIG. 5A is a schematic flow chart diagram illustrating one embodiment of a graph-based response generation method.

FIG. 5A is a schematic flow chart diagram illustrating one embodiment of a graph-based response generation method 500. The method 500 uses one or more graphs 300 to generate a response 295 to a natural language command 290. The method 500 may be performed by the processor 405. In addition, the processor 405 may be assisted by the neural network 475.

The method 500 starts, and in one embodiment, the processor 405 receives 505 the natural language command 290. The natural language command 290 may be received through the input device 110.

The processor 405 may identify 510 one or more relevant data sets 255 in response to the natural language command 290 received from the input device 110. In one embodiment, each relevant data 255 set comprises one of a subject 305 of the natural language command 290 and a subject 305 of another relevant data set 255. For example, if the subject 305 of the natural language command 290 is "Davis," each data set 255 that includes "Davis" may be identified. In addition, the subjects 305 of the identified relevant data sets 255 are also determined. Data sets 255 that include these determined subjects 305 may also be identified 510 as relevant data sets 255.

The processor 405 may generate 515 a graph 300 for each of the one or more relevant data sets 255. In one embodiment, the processor 405 generates 515 the graph 300 by identifying each subject 305 in the relevant data set 255. The processor 405 may further generate a relationship 310 between two or more subjects 305. Each graph 300 may comprise two or more of the subjects 305 and one or more relationships 310 between the two or more subjects 305. As a result, the processor 405 may generate a graph 300a-b such as is illustrated in FIGS. 3A-B, wherein each graph 300a-b is generated from one data set 255. The generation 515 of a graph 300 is described in more detail in FIG. 5B.

The processor 405 may concatenate 520 the graphs 300 into a concatenated graph 320. In one embodiment, the graphs 300 are concatenated 520 by merging subjects 305 as will be described in more detail in FIG. 5C.

In one embodiment, the processor 405 determines 525 if the user will provide feedback for the concatenated graph 320. The determination 525 may be based on a user preference and/or a user command. In addition, the processor 405 may determine 525 that user feedback is required if the concatenated graph 320 exceeds a complexity threshold.

If the processor 405 determines 525 that user feedback will not be provided, the processor 405 may generate 540 a response 295 to the natural language command 290 based on the concatenated graph 320 as will be described hereafter. If the processor 405 determines 525 that user feedback will be provided, the processor 405 may display 530 the concatenated graph 320 to the user. The processor 405 may further receive 535 edits to the concatenated graph 320. In one embodiment, the user may add relationships 310 to the concatenated graph 320. In addition, the user may add subjects 305 to the concatenated graph 320. The user may further delete relationships 310 and/or subjects 305 from the concatenated graph 320.

The processor 405 may generate 540 the response 295 to the natural language command 290 based on the concatenated graph 320. The response 295 may include taking an action such as scheduling a meeting or sending a message. The generation 540 of the response 295 is described in more detail in FIG. 5D.

In one embodiment, the processor 405 displays 545 the concatenated graph 320 and the method 500 ends. The concatenated graph 320 may illustrate and/or provide rationale for the response 295.

Figure 5B:
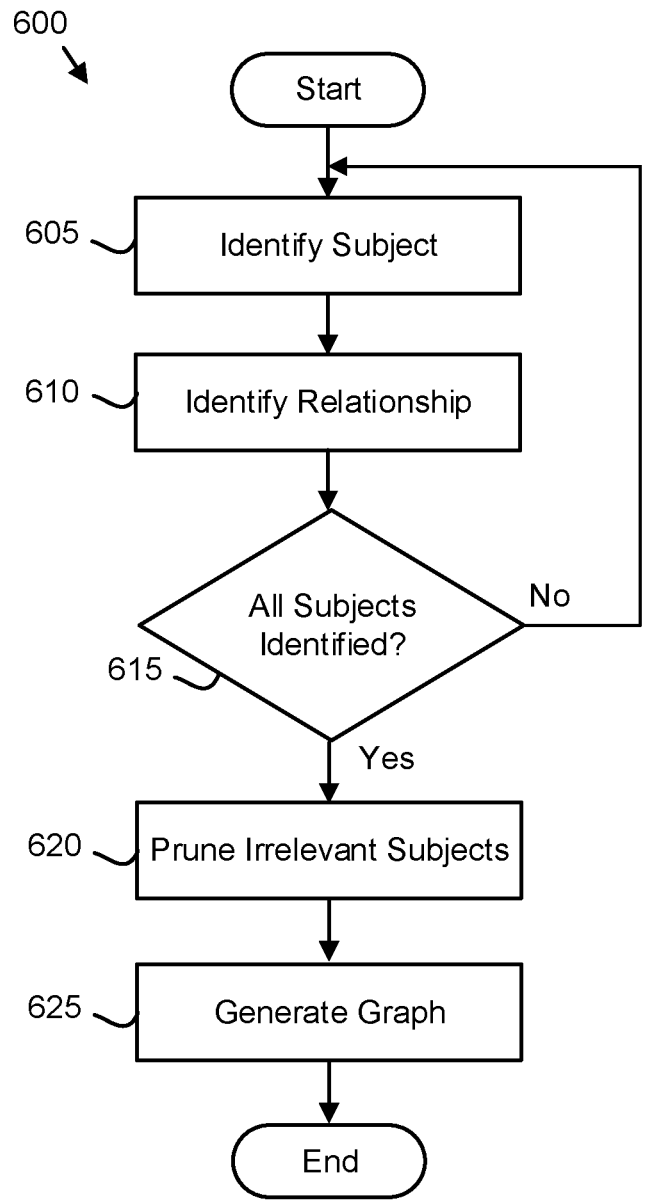
FIG. 5B is a schematic flow chart diagram illustrating one embodiment of a graph method.

FIG. 5B is a schematic flow chart diagram illustrating one embodiment of a graph method 600. The method 600 may generate a graph 300 from a data set 255. The method 600 may perform step 515 of FIG. 5A. The method 600 may be performed by the processor 405. The processor 405 may be assisted by the neural network 475.

The method 600 starts, and in one embodiment, the processor 405 identifies 605 a subject 305 in a data set 255. The processor 405 may identify 605 proper nouns as subjects 305. In addition, the processor 405 may identify 605 nouns, gerunds, and/or pronouns as subjects 305. In a certain embodiment, the processor 405 identifies 605 the most frequently referenced nouns as the subjects 305. For example, only nouns that are referenced a number of times that exceeds a reference threshold may be identified 605.

The processor 405 further identifies 610 relationships 310 between subjects 305. In one embodiment, the processor 405 may apply natural language processing to identify 610 the relationships 310. In addition, the neural network 475 may be trained to identify 610 the relationships 310.

The processor 405 may determine 615 whether all subjects 305 been identified. If all subjects 305 have not been identified, the processor 405 continues to identify 605 subjects 305. If all subjects 305 have been identified, the processor 405 may prune 620 irrelevant subjects 305. In one embodiment, subjects 305 that are included in a list of low value subjects may be pruned 620 from the graph 300. In addition, a relevance score may be calculated for each subject 305. The relevance score may estimate a relevance of the subject 305 to the natural language command 290. Subjects 305 with a relevance score that is less than a relevance threshold may be pruned 620 from the graph 300. In one embodiment, subjects 305 with no relationships 310 to other subjects 305 may be pruned 620 from the graph 300.

The processor 405 may generate 625 the graph 300 and the corresponding graph data 205 and the method 600 ends. In one embodiment, a first subject 305 is selected and added to a two-dimensional space. Each relationship 310 associated with the first subject 305 may be added to the two-dimensional space along with the subjects 305 associated with the relationships 310. Relationships 310 and subjects 305 may be iteratively added to the two-dimensional space until all subjects 305 and/or relationships 310 are included in the graph 300. The graph data 205 may be generated from the two-dimensional space.

Figure 5C:
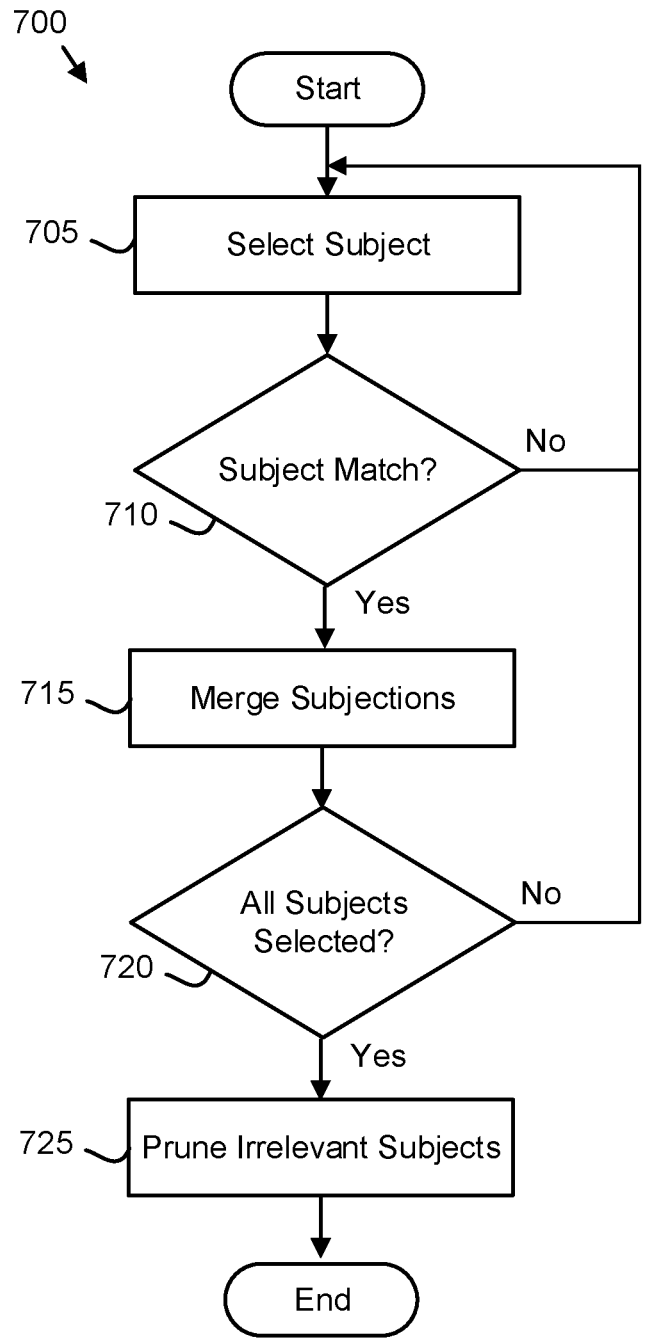
FIG. 5C is a schematic flow chart diagram illustrating one embodiment of a concatenated graph generation method.

FIG. 5C is a schematic flow chart diagram illustrating one embodiment of a concatenated graph generation method 700. The method 700 may concatenate two or more graphs 300 into a concatenated graph 320. The method 700 may perform step 520 of FIG. 5A. The method 700 may be performed by the processor 405. The processor 405 may be aided by the neural network 475.

The method 700 starts, and in one embodiment, the processor 405 selects 705 a first subject 305. The first subject 305 may be selected 705 from a first graph 300a. The first subject 305 and associated relationships 310 and subjects 305 may be added to the concatenated graph 320. In addition, all subjects 305 and relationships 310 from the first graph 300a may be added to the concatenated graph 320. The graph data 25 for each added subject 305 and relationship 310 may be copied to graph data 205 for the concatenated graph 320.

The processor 405 may further determine 710 if the first subject 300 matches the second subject 305. The second subject 305 may be in the second graph 300b. In addition, the second subject 305 may be in the first graph 300a. If no match is determined 710, the processor 405 continues to select 705 a new first subject 305.

In response to determining 710 a match with a second subject 305 the processor 405 may merge 715 the first subject 305 and the second subject 305. In one embodiment, the first subject 305 is overwritten on the second subject 305 in the graph data 205 and in all relationships 310 for the concatenated graph 320.

The processor 405 may determine 720 if all subjects 305 have been selected. If all subjects 305 is not been selected, the processor 405 continues to select 705 new subjects 305. If all subjects 305 have been selected, the processor 405 may prune 725 irrelevant subjects 305 from the concatenated graph 320 and the method 700 ends. In one embodiment, subjects 305 that are included in the list of low value subjects may be pruned 725 from the concatenated graph 320. In addition, the relevance score may be recalculated for each subject 305 of the concatenated graph 320. Subjects 305 with a relevance score that is less than the relevance threshold may be pruned 725 from the concatenated graph 320. In one embodiment, subjects 305 with no relationships 310 to other subjects 305 may be pruned 725 from the concatenated graph 320. After pruning, the graph data 205 for the concatenated graph 320 is ready for analysis and/or display.

Figure 5D:
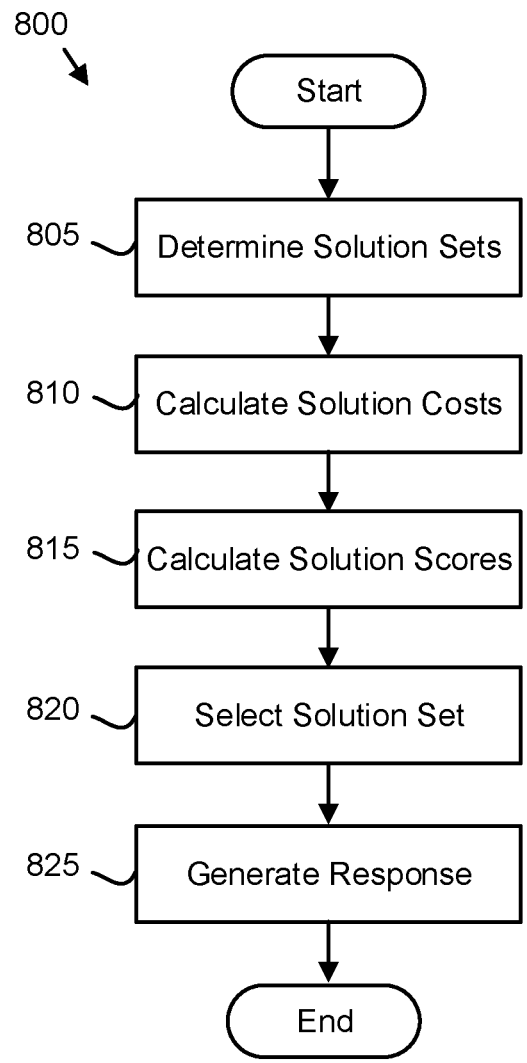
FIG. 5D is a schematic flow chart diagram illustrating one embodiment of a response generation method.

FIG. 5D is a schematic flow chart diagram illustrating one embodiment of a response generation method 800. The method 800 may generate the response 295 to the natural language command 290. The method 800 may perform step 540 of FIG. 5A. The method may be performed by the processor 405. The neural network 475 may assist the processor 405.

The method 800 starts, and in one embodiment, the processor 405 determines 805 one or more solution sets 265 for the concatenated graph 320. In one embodiment, each selected solution set 265 comprises one or more subjects 305 and relationships 310 that satisfy and/or partially satisfy the natural language command 290. The neural network 475 may generate the solution set 265 from the graph data 205 for the concatenated graph 320.

The processor 405 may calculate 810 a solution cost 275 for each solution set 265. In one embodiment, the solution cost 275 comprises a total cost for including each subject 305 and/or relationship 310 in the solution set 265.

The processor 405 may further calculate 815 a solution score 270 for each solution set 265. In one embodiment, the solution score SS 270 is calculated using Equation 1, where $S_{SS}$ is a number of subjects 305 in the solution set 265, SNLC is a number of subjects 305 in a natural language command 290, and $w_i$ is a weight for each subject 305.

$$SS = \Sigma w_i S_{SSi} / \Sigma w_i S_{NLCi} \qquad \text{Equation 1}$$

The processor 405 may select 820 a solution set 265 with the highest solution score 270 for the response 295. In one embodiment, the selected solution set 265 is selected 820 as a function of the solution score 270 and the solution cost 275. In a certain embodiment, a modified solution score SM is calculated from the solution score 270 and the solution cost SC 275 as shown in Equation 2.

$$SM = SS / SSC \qquad \text{Equation 2}$$

The solution set 265 with the highest modified solution score may be selected 820 for the response 295. The processor 405 may generate 825 the response 295 from the subjects 305 and/or relationships 310 of the solution set 265 and the method 800 ends. In one embodiment, the neural network 275 may generate the response 295 based on the subjects 305 and/or relationships 310 being used as inputs.

Figure 5E:
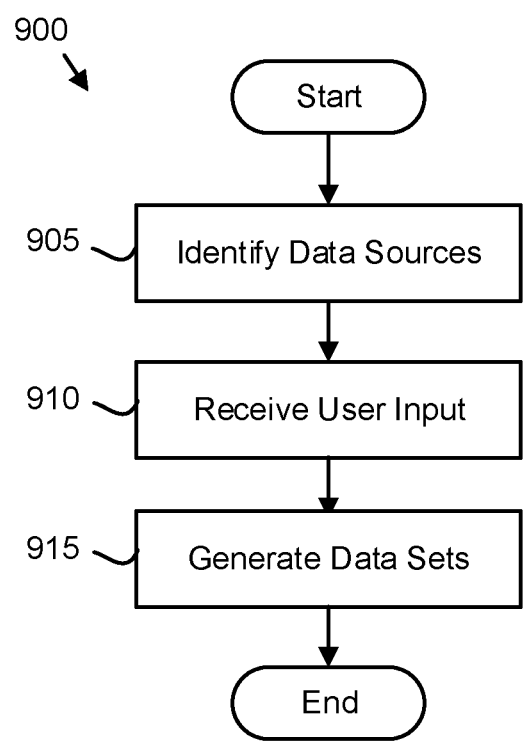
FIG. 5E is a schematic flowchart diagram illustrating one embodiment of a data set generation method.

FIG. 5E is a schematic flowchart diagram illustrating one embodiment of a data set generation method 900. The method 900 may generate data sets 255. The data sets 255 may be used in step 510 of FIG. 5A. The method 900 may be performed by a processor 405. In addition, the neural network 475 may assist the processor 405.

The method 900 starts, and in one embodiment, the processor 405 identifies 905 the data source. The data source may be a document, a message, a web page, a search result, a presentation, a video, an audio file, an organizational chart, the calendar, and the like.

The processor 405 may further receive 910 user inputs. The user inputs may identify subjects 305 and/or relationships 310. In addition, the processor 405 may generate 915 the data set 255 from the subjects 305 and relationships 310 of the data source and/or the subjects 305 and/or relationships 310 from the user inputs and the method 900 ends.

The embodiments identify relevant data sets 255 in response to a natural language command 290 received from an input device 110. The embodiments further generate a graph 300 for each of the relevant data sets 255. An appropriate response 295 may be difficult to generate from the one or more graphs 300. To improve the efficiency of generating a response 295, the embodiments generate a concatenated graph 320 from the one or more graphs 300. The embodiments further generate the response 295 to the natural language command 290 based on the concatenated graph 320. As a result, the generation of the response 295 is greatly enhanced and made more efficient.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an input device;
a processor;
a memory that stores code executable by the processor to:
identify two or more relevant data sets in response to a natural language command received from the input device, wherein a first relevant data set comprises a first subject of the natural language command and a second relevant data set comprises a second subject of the first relevant data set;
generate a graph for each of the two or more relevant data sets;
concatenate the graphs into a concatenated graph by merging the second subject of a first graph for the first relevant data set and the second subject of a second graph for the second relevant data set;
in response to the concatenated graph exceeding a complexity threshold, determine that user feedback is required;
display the concatenated graph;
receive edits to the graph;
determine one or more solution sets from the edited concatenated graph;
calculate a solution score for each solution set a sum of a weighted number of subjects in the solution set divided by a sum of a weighted number of subjects in the natural language command;
modify each solution score as the solution score divided by a square root of a solution cost for the solution score;
select a solution set with a highest modified solution score for the response; and
generate a response to the natural language command based on the selected solution set of the concatenated graph.

2. The apparatus of claim 1, wherein each graph comprises two or more of the subjects and one or more relationships between the two or more subjects.

3. The apparatus of claim 2, wherein the code is further executable by the processor to prune irrelevant subjects.

4. A method comprising:
identifying, by use of a processor, two or more relevant data sets in response to a natural language command, wherein a first relevant data set comprises a first subject of the natural language command and a second relevant data set comprises a second subject of the first relevant data set;
generating a graph for each of the two or more relevant data sets;
concatenating the graphs into a concatenated graph by merging the second subject of a first graph for the first relevant data set and the second subject of a second graph for the second relevant data set;
in response to the concatenated graph exceeding a complexity threshold, determining that user feedback is required;
displaying the concatenated graph;
receiving edits to the graph;
determining one or more solution sets from the edited concatenated graph;
calculating a solution score for each solution set a sum of a weighted number of subjects in the solution set divided by a sum of a weighted number of subjects in the natural language command;
modifying each solution score as the solution score divided by a square root of a solution cost for the solution score;
selecting a solution set with a highest modified solution score for the response; and
generating a response to the natural language command based on the selected solution set of the concatenated graph.

5. The method of claim 4, wherein each graph comprises two or more of the subjects and one or more relationships between the two or more subjects.

6. The method of claim 5, the method further comprising pruning irrelevant subjects.

7. A program product comprising a non-transitory computer readable storage medium that stores code executable by a processor to perform:
identifying two or more relevant data sets in response to a natural language command, wherein a first relevant data set comprises a first subject of the natural language command and a second relevant data set comprises a second subject of the first relevant data set;
generating a graph for each of the two or more relevant data sets;
concatenating the graphs into a concatenated graph by merging the second subject of a first graph for the first relevant data set and the second subject of a second graph for the second relevant data set;
in response to the concatenated graph exceeding a complexity threshold, determining that user feedback is required;
displaying the concatenated graph;
receiving edits to the graph;
determining one or more solution sets from the edited concatenated graph;
calculate a solution score for each solution set a sum of a weighted number of subjects in the solution set divided by a sum of a weighted number of subjects in the natural language command;
modify each solution score as the solution score divided by a square root of a solution cost for the solution score;
select a solution set with a highest modified solution score for the response; and
generating a response to the natural language command based on the selected solution set of the concatenated graph.

8. The program product of claim 7, wherein each graph comprises two or more of the subjects and one or more relationships between the two or more subjects.

9. The program product of claim 8, the processor further pruning irrelevant subjects.

* * * * *